July 16, 1929.  F. E RICHARDS  1,721,355
MOWER
Filed Oct. 24, 1927   2 Sheets-Sheet 2

F. E. Richards
INVENTOR

Patented July 16, 1929.

1,721,355

UNITED STATES PATENT OFFICE.

FRANK E. RICHARDS, OF JACKSON, MISSISSIPPI.

MOWER.

Application filed October 24, 1927. Serial No. 228,393.

This invention relates to a mowing machine for cutting grain or grass.

The object is to provide a simple mechanism by which a continuous shearing action on the grain may be obtained by operation of a band saw continuously acting against a stationary toothed cutter bar. The device is maintained in operation by a traction wheel having an annular gear concentric with the axle and a pivoted pinion and drive shaft universally jointed with the mowing cutter and driving a sprocket engaging a band toothed cutter, I am aware that band cutters per se have been heretofore proposed in mowers, but my improvement is a simple mechanism for shifting the mechanism into and out of gear and supporting the cutting apparatus in going to and from its work. The band cutter is operated by a pair of small sprockets which engage the band saw with a row of holes to register with the sprocket teeth and is turned by a pinion engaged by the wheel crown-gear. The sprockets are journaled in a bar trailing on the ground or supported on casters and connected with a hinged bar on the opposite side of the machine and have a flexible connection with a bar linked to the fixed axle. The cutter may be thrown into and out of clutch by shifting the pinion radially and freeing it from the crown gear permitting the cutter to be rotated transversely of the machine.

The features of novelty will be more fully herein described and will be definitely indicated in the appended claims.

In the accompanying drawings illustrating the invention.

Figure 5 is an enlarged elevation of one end of the suspension bar.

Figure 1:
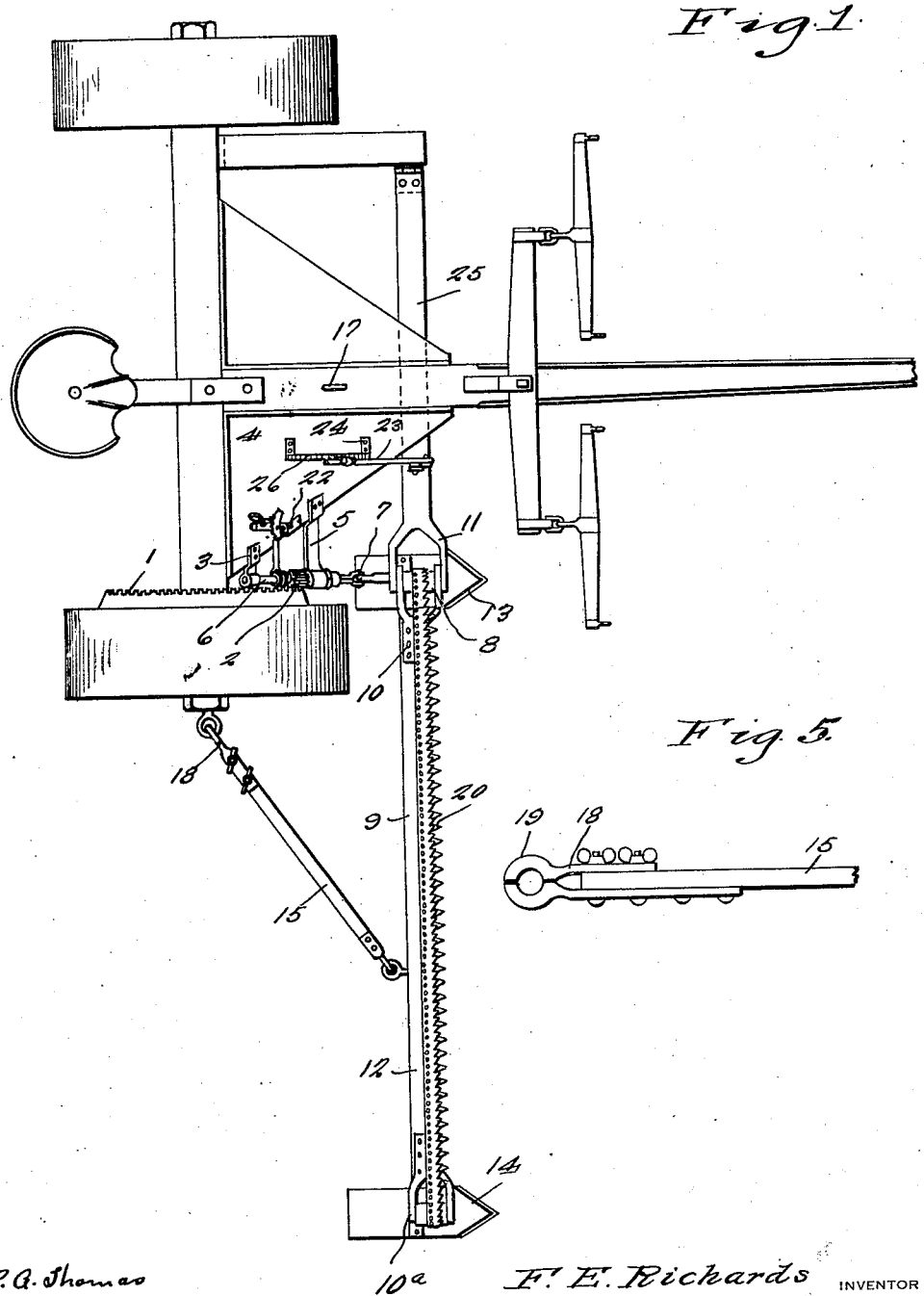
Figure 1 is a plan view of a mower embodying the invention.
Figure 2:
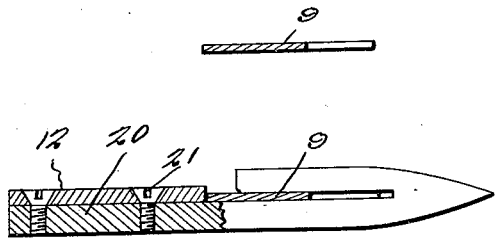
Figure 2 are sectional details of the fixed and movable saw.
Figure 3:
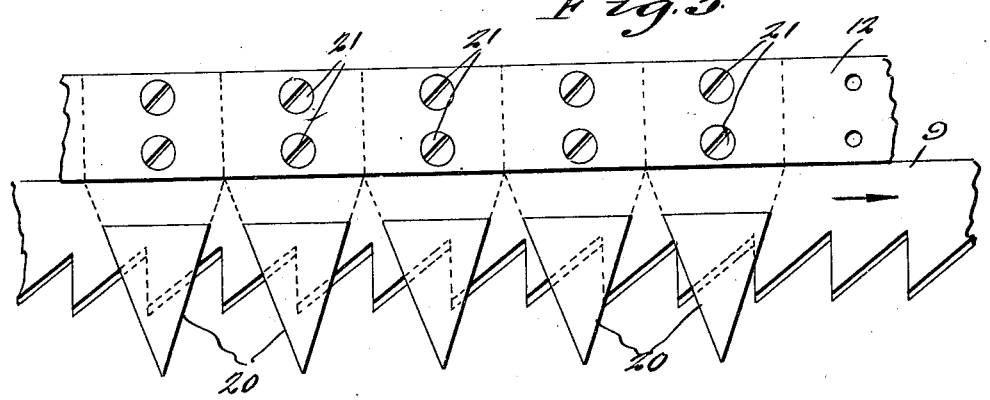
Figure 3 is a face view of the saws.
Figure 4:
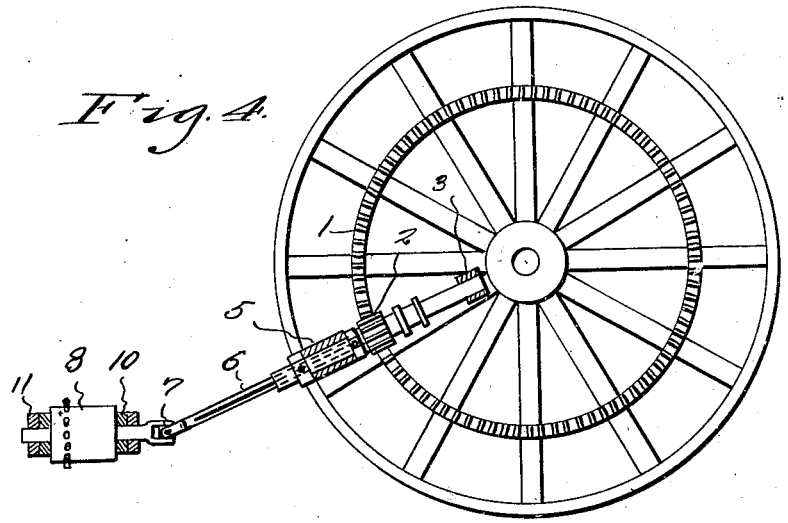
Figure 4 is a part sectional view of the cutter drive.

Referring now in detail to the drawings, a horse drawn vehicle with a seat for a driver is shown in Figure 1. The mode of propulsion is not material, however. The machine has a fixed axle on which the wheels turn on one of the wheels is mounted concentric with the axis of rotation and a crown gear 1 adapted to mesh with a pinion 2 fixed on an inclined shaft, journaled at the upper end in a bracket 3 in a downwardly inclined fixed metal plate 4, fixed to the machine frame. The pinion is splined on the shaft which has a lower support just under the pinion 5 mounted on the plate 4. The pinion shaft 6 has an universal joint 7 with a sprocket 8 and the teeth of which mesh with holes in the edge of a band endless saw 9. The sprocket is journaled in a yoke 10, pivoted on the shaft of the sprocket conjointly with the yoke 11. The latter forms part of a metal bar hinged at the far side of the vehicle about level with the axle. The sprockets are supported on yokes 10, 10ª secured on the bar 12. On the under sides of the bar are mounted at right angles slide shoes 13, 14. The bar 12 is suspended by a metal strip 15, detachably connected with the fixed axle and an eyebolt on the bar 12, and by freeing the strip may be swung in a transverse arc and the strip fastened to a staple 17. The end of the iron strip 15 carries a separable section 18 with a curved tip 19 with two holes to accommodate screws and may surround a staple on the axle or be transferred to staple 17 of the vehicle. The bar 12 carries a sectional shearing blade, the multiple sections 23 which are secured by screws 21 rendering them removable independently for sharpening. The band saw traverses the lower edge of this sectional blade. The pinion 2 may be shifted out of clutch with the gear 1 by a bell crank pivoted on a bracket 22 and latched in or out of gear. A bell crank lever 23 pivoted on a bracket 24, mounted on the plate 4 is pivotally connected with the hinged arm 25 and may be raised or lowered by a lever and latched on a quadrant 26.

It will be evident that by the construction above described, the folded cutter is hooked in the staple 17. The machine may be wheeled to its place of work, and set up by disconnecting strip 15 from staple 17 the plate 8, lowering the cutter to the ground and connecting the strip 15 with the axle. The pinion 2 is then lowered into gear with the drive wheel and on being driven forward the band saw shears the grain or hay by a shearing action of the movable teeth against the fixed toothed blade.

Having thus described my invention, what

I claim as new and desire to secure by Letters Patent, is:—

1. In a mowing machine of the character described, a wheeled frame, a horizontally disposed arm arranged transversely at the front of the frame, a cutter bar pivotally mounted on one extremity of said arm and normally arranged in end to end relation therewith projecting an appreciable distance beyond the side of the machine, a suspension arm having one end pivotally connected with the cutter bar and its other end detachably connected with the adjacent end of the axle to support the cutter bar in position for use, said cutter bar being capable of being swung on said arm to an inactive position, and means carried by the last mentioned end of said suspension arm for connection with the frame of the machine to hold the cutter bar in its inactive position.

2. In a mowing machine of the character described, a wheeled frame, an arm arranged transversely of the frame and supported at the forward end thereof, a cutter bar pivotally mounted on said arm and normally arranged in end to end relation therewith, an element projecting from one end of the axle of the machine, a second element supported on the frame of the machine, and a suspension arm pivotally connected with the cutter bar at an appropriate point in its length, means carried by one end of the suspension arm and adapted to be connected with the element on the axle when the cutter bar is supported horizontally, said means being adapted to be connected with the element on the frame to hold the bar in an inactive position, and a band saw carried by said cutter bar.

3. In a mowing machine of the character described, a wheeled frame, a crown gear mounted on one of the wheels, an inclined plate supported by the frame, an arm pivotally mounted on the frame and arranged transversely thereof and passed beneath said plate, a cutter bar pivotally supported by one end of said arm, a band saw associated with the cutter bar, a rotatable shaft for said saw, bearings supported by and projecting beyond one edge of said plate, a driven shaft journaled in said bearings, a universal connection between the said shafts, a pinion carried by the driven shaft and meshing with the crown gear on said wheel, and a suspension bar pivotally connected with the cutter bar and having one end adapted to be connected with the axle of the machine to support the cutter bar in position for use, and adapted to be connected with the frame of the machine to support the cutter bar in an inactive position.

In testimony whereof I affix my signature.

FRANK E. RICHARDS.